US011507446B1

(12) United States Patent
Sheshagiri Naik et al.

(10) Patent No.: US 11,507,446 B1
(45) Date of Patent: Nov. 22, 2022

(54) HOT-SWAP CONTROLLER FAULT REPORTING SYSTEM

(71) Applicant: Dell Products L.P., Round Rock, TX (US)

(72) Inventors: Akshata Sheshagiri Naik, Leander, TX (US); Rui An, Austin, TX (US); Chandrasekhar Mugunda, Austin, TX (US); Shivabasava Karibasappa Komaranalli, Round Rock, TX (US)

(73) Assignee: Dell Products L.P., Round Rock, TX (US)

( * ) Notice: Subject to any disclaimer, the term of this patent is extended or adjusted under 35 U.S.C. 154(b) by 10 days.

(21) Appl. No.: 17/347,200

(22) Filed: Jun. 14, 2021

(51) Int. Cl.
*G06F 11/00* (2006.01)
*G06F 11/07* (2006.01)

(52) U.S. Cl.
CPC ...... *G06F 11/0772* (2013.01); *G06F 11/0706* (2013.01); *G06F 11/0751* (2013.01); *G06F 11/0787* (2013.01)

(58) Field of Classification Search
None
See application file for complete search history.

(56) References Cited

U.S. PATENT DOCUMENTS

2009/0089624 A1* 4/2009 Austen ................ G06F 11/0706 714/39
2012/0023367 A1* 1/2012 Rudy .................. G06F 11/3031 714/E11.131

FOREIGN PATENT DOCUMENTS

CN 103617104 B 3/2014

OTHER PUBLICATIONS

Google Scholar/Patents search—text refined (Year: 2022).*
"MIC2590 PCI Hot-Plug Controller," MIC2590—Power Management—Hot Swap Controller, 2 pages, [Retrieved on Jun. 14, 2021], Retrieved from the Internet: hpts://www.microchip.com/wwwprodusts/en/MIC2590.
"MIC2590B Dual-Slot PCI Hot Plug Controller," Micrel, Inc., Sep. 2008, 23 pages, [Retrieved on Jun. 14, 2021], Retrieved from the Internet: https://ww1.microchip.com/downloads/en/DeviceDoc/mic2590b.pdf.

* cited by examiner

*Primary Examiner* — Christopher S McCarthy
(74) *Attorney, Agent, or Firm* — Joseph Mencher

(57) ABSTRACT

A hot-swap controller fault reporting system includes component(s), a hot-swap controller that is coupled to the component(s), and a hot-swap controller fault reporting subsystem that is coupled to the hot-swap controller. The hot-swap controller fault reporting subsystem identifies a hot-swap controller fault that was generated by the hot-swap controller and that is associated with the component(s), generates an Intelligent Platform Management Interface (IPMI) bit combination that is based on the hot-swap controller fault and that is configured to identify the hot-swap controller and a type of the hot-swap controller fault, and provides a log entry based on the IPMI bit combination in a log database.

20 Claims, 12 Drawing Sheets

| EVENT DATA 1 | | | |
|---|---|---|---|
| | BIT 7:6 | 10b | OEM CODE IN BYTE 2 FOR HSC FAILED EVENT SOURCE |
| | BIT 5:4 | 10b | OEM CODE IN BYTE 3 IDENTIFYING HSC THAT TRIGGERED FAILED EVENT |
| | BIT 3:0 | | OFFSET FROM EVENT/READING CODE FOR DISCRETE EVENT STATE |
| | | 0x6 | HSC HARD FAULTS (FET) |
| | | 0x7 | HSC POWER FAULT |
| EVENT DATA 2 | | | HSC FAILED EVENT SOURCE |
| | BIT 0 | 1b | OVER CURRENT (OC) |
| | BIT 1 | 1b | OVER VOLTAGE (OV) |
| | BIT 2 | 1b | UNDER VOLTAGE (UV) |
| | BIT 3 | 1b | OVER TEMPERATURE (OT) |
| | BIT 4 | 1b | COMMON FAILURE |
| | BIT 7:5 | -- | RESERVED |

FIG. 4A

| EVENT DATA 3 | | | HSC NUMBER |
|---|---|---|---|
| | BIT 0 | 1b | HSC1 |
| | BIT 1 | 1b | HSC2 |
| | BIT 2 | 1b | HSC3 |
| | BIT 3 | 1b | HSC4 |
| | BIT 4 | 1b | HSC5 |
| | BIT 5 | 1b | HSC6 |
| | BIT 7:6 | -- | RESERVED |

FIG. 4B

HOT-SWAP CONTROLLER FAULT REPORTING SYSTEM

BACKGROUND

The present disclosure relates generally to information handling systems, and more particularly to reporting hot-swap controller faults in information handling systems.

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Information handling systems such as, for example, server systems like the DELL EMC® POWEREDGE® XE7100 or the DELL EMC® POWEREDGE XE8545 available from DELL® EMC® of Hopkinton, Mass., United States and Round Rock, Tex., United States, would benefit from the implementation of hot-swap controllers to monitor, report, and protect the server system from faults with server components (e.g., short circuits, over-current draws, etc.) that could otherwise draw large currents that lead to server system damage, power losses, and/or other fault issues known in the art. However, currently such server systems do not include any ability to monitor such hot-swap controllers and report faults detected by those hot-swap controllers, and a customized monitoring/reporting solution for hot-swap controllers increases the costs associated with such server systems, while also limiting adoption by users that do not wish to dedicate resources to obtain the subsystems needed to support such customized monitoring/reporting solutions.

Accordingly, it would be desirable to provide a hot-swap controller fault reporting system that addresses the issues discussed above.

SUMMARY

According to one embodiment, an Information Handling System (IHS) includes a processing system; and a memory system that is coupled to the processing system and that includes instructions that, when executed by the processing system, cause the processing system to provide a hot-swap controller fault reporting engine that is configured to: identify a hot-swap controller fault that was generated by a hot-swap controller and that is associated with a component that is coupled to the hot-swap controller; generate, based on the hot-swap controller fault, an Intelligent Platform Management Interface (IPMI) bit combination that is configured to identify the hot-swap controller and a type of the hot-swap controller fault; and provide a log entry based on the IPMI bit combination in a log database.

BRIEF DESCRIPTION OF THE DRAWINGS

FIG. 4A is a schematic view illustrating an embodiment of a portion of a mapping that may be utilized in the computing devices of FIGS. 2 and 3 to provide the hot-swap controller fault reporting system of the present disclosure.

FIG. 4B is a schematic view illustrating an embodiment of a portion of a mapping that may be utilized in the computing devices of FIGS. 2 and 3 to provide the hot-swap controller fault reporting system of the present disclosure.

DETAILED DESCRIPTION

For purposes of this disclosure, an information handling system may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, mobile device (e.g., personal digital assistant (PDA) or smart phone), server (e.g., blade server or rack server), a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, touchscreen and/or a video display. The information handling system may also include one or more buses operable to transmit communications between the various hardware components.

Figure 1:
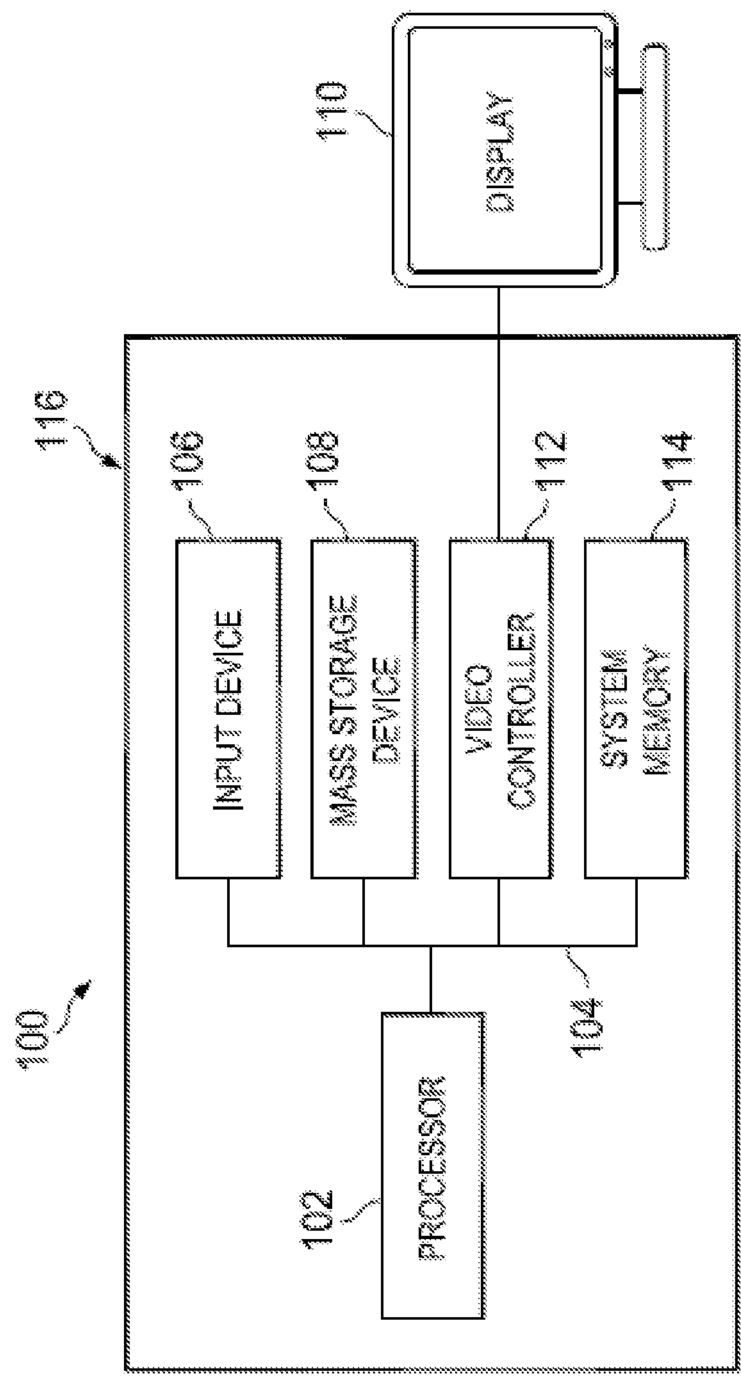
FIG. 1 is a schematic view illustrating an embodiment of an Information Handling System (IHS).

In one embodiment, IHS 100, FIG. 1, includes a processor 102, which is connected to a bus 104. Bus 104 serves as a connection between processor 102 and other components of IHS 100. An input device 106 is coupled to processor 102 to provide input to processor 102. Examples of input devices may include keyboards, touchscreens, pointing devices such as mouses, trackballs, and trackpads, and/or a variety of other input devices known in the art. Programs and data are stored on a mass storage device 108, which is coupled to processor 102. Examples of mass storage devices may include hard discs, optical disks, magneto-optical discs, solid-state storage devices, and/or a variety of other mass storage devices known in the art. IHS 100 further includes a display 110, which is coupled to processor 102 by a video controller 112. A system memory 114 is coupled to processor 102 to provide the processor with fast storage to facilitate execution of computer programs by processor 102. Examples of system memory may include random access memory (RAM) devices such as dynamic RAM (DRAM), synchronous DRAM (SDRAM), solid state memory devices, and/or a variety of other memory devices known in the art. In an embodiment, a chassis 116 houses some or all of the components of IHS 100. It should be understood that other buses and intermediate circuits can be deployed between the components described above and processor 102 to facilitate interconnection between the components and the processor 102.

Figure 2:
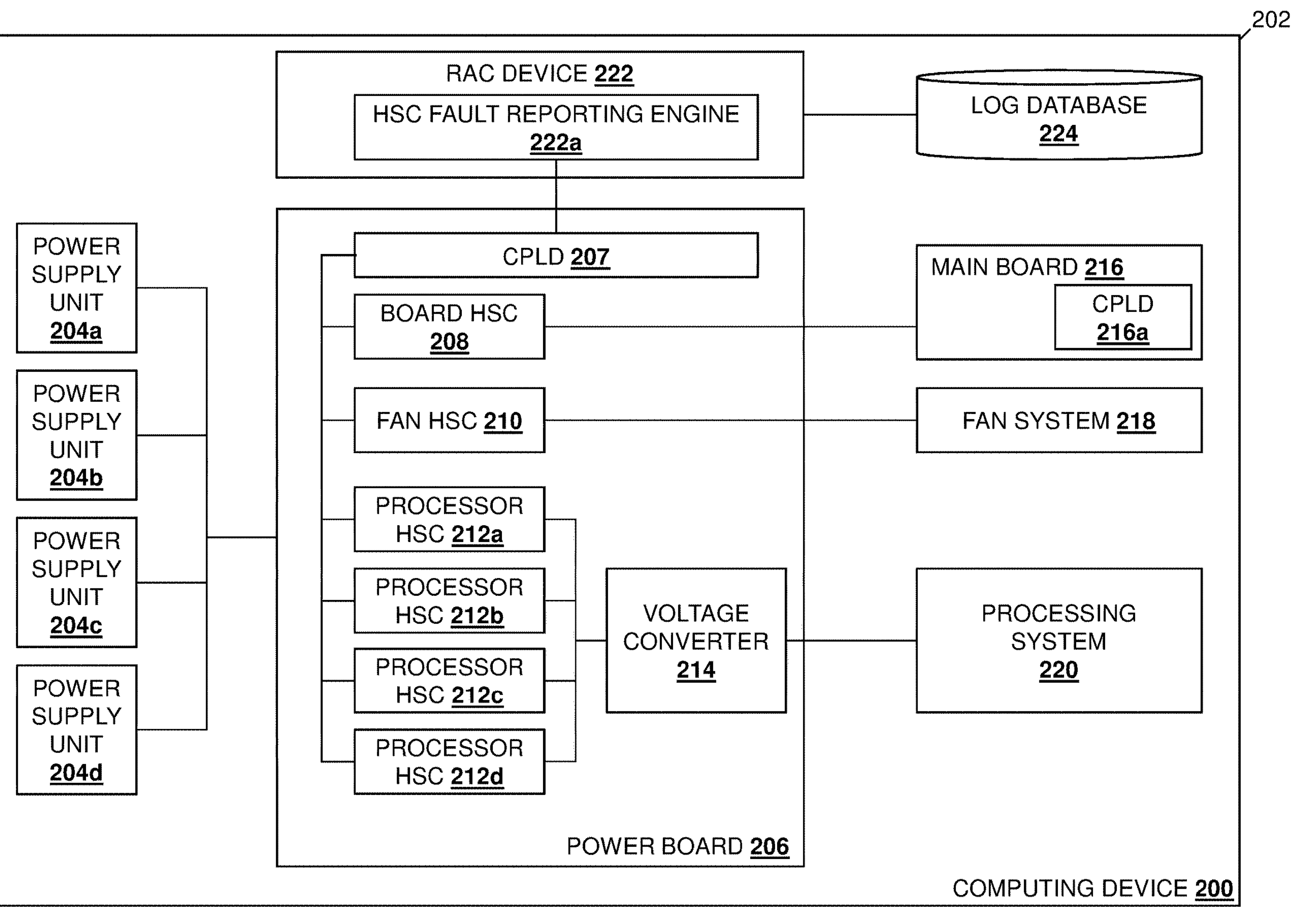
FIG. 2 is a schematic view illustrating an embodiment of a computing device that may include the hot-swap controller fault reporting system of the present disclosure.

Referring now to FIG. 2, an embodiment of a computing device 200 is illustrated that may utilize the hot-swap controller fault reporting system of the present disclosure. In an embodiment, the computing device 200 may be provided by the IHS 100 discussed above with reference to FIG. 1 and/or may include some or all of the components of the IHS 100, and in specific examples may be provided by a server system such as the DELL EMC® POWEREDGE XE8545 available from DELL® EMC® of Hopkinton, Mass., United States and Round Rock, Tex., United States. Furthermore, while illustrated and discussed as being provided by a particular server system, one of skill in the art in possession of the present disclosure will recognize that the functionality of the computing device 200 discussed below may be provided by other devices that are configured to operate similarly as the computing device 200 discussed below. In the illustrated embodiment, the computing device 200 includes a chassis 202 that houses the components of the computing device 200, only some of which are illustrated below. For example, the chassis 202 may house a plurality of power supply units 204*a*, 204*b*, 204*c*, and 204*d* and/or other power components known in the art.

In the illustrated embodiment, each of the power supply units 204*a*-204*d* is coupled to a power board 206 (e.g., a Power Distribution Board (PDB) and/or other power circuit boards that would be apparent to one of skill in the art in possession of the present disclosure), which one of skill in the art in possession of the present disclosure will appreciate may be configured to distribute power from the power supply units 204*a*-204*d* to the computing device components in the chassis 202, discussed in further detail below. As discussed below, the power board 206 may include a Complex Programmable Logic Device (CPLD) 207, but one of skill in the art in possession of the present disclosure will appreciate that the CPLD 207 may be replaced by any of a variety of other logic devices known in the art. As will be appreciated by one of skill in the art in possession of the present disclosure, the CPLD 207 may include a register subsystem such as, for example, memory registers, that are configurable to report the hot-swap controller faults discussed below (e.g., as well as storing identifications for each hot-swap controller and its "power-good" status).

In the illustrated embodiment, the power board 206 also includes a board Hot-Swap Controller (HSC) 208, a fan HSC 210, a plurality of processor HSCs 212*a*, 212*b*, 212*c*, and 212*d*, and a voltage converter 214 that is coupled to the plurality of processor HSCs 212*a*-212*d*. As illustrated, the chassis 202 houses a main board 216 that is coupled to the board HSC 208 and that includes a CPLD 216*a*, a fan system 218 that is coupled to the fan HSC 210, and a processing system 220 that is coupled to the processor HSCs 212*a*-212*d* via the voltage converter 214. As discussed above, each of the board HSC 208, the fan HSC 210, and processor HSCs 212*a*-212*d* may be configured to monitor, report, and protect the computing device 200 from faults (e.g., short circuits, over-current draws, etc.) associated with the main board 216, the fan system 218, and the processing system 220, respectively, that could otherwise draw large currents that lead to computing device damage, power losses, and/or other fault issues known in the art. In a specific example in which the computing device 200 is provided by the DELL EMC® POWEREDGE XE8545 server system discussed above, the main board 216 may be a motherboard that is monitored, reported, and protected by the board HSC 208, the fan system 218 includes a plurality of fan devices that are monitored, reported, and protected by the fan HSC 210, and the processing system 220 may be provided by four GPUs that are each monitored, reported, and protected by a respective one of the processor HSCs 212*a*-212*d* (e.g., with the voltage converter 214 converting 12 volts to 48 volts for use by the GPUs). However, while specific computing device including specific components has been described, one of skill in the art in possession of the present disclosure will appreciate that other computing devices with other components will fall within the scope of the present disclosure as well.

As discussed below, the chassis 202 may include a hot-swap controller fault reporting subsystem that, in the embodiment illustrated in FIG. 2, is provided by a Remote Access Controller (RAC) device 222 that is coupled to the CPLD 207. In a specific example, the remote access controller device 222 may be provided by an integrated DELL® Remote Access Controller (iDRAC) available in server systems provided by DELL EMC® as discussed above, although other remote access controller devices/Baseboard Management Controller (BMC) devices will fall within the scope of the present disclosure as well. As illustrated, the remote access controller device 222 may include a processing system (not illustrated, but which may include the processor 102 discussed above with reference to FIG. 1) and a memory system (not illustrated, but which may include the memory 114 discussed above with reference to FIG. 1) that is coupled to the processing system and that includes instructions that, when executed by the processing system, cause the processing system to provide a Hot-Swap Controller (HSC) fault reporting engine 222*a* that is configured to perform the functionality of the hot-swap controller fault reporting engines and/or hot-swap controller fault reporting subsystems/remote access controller devices discussed below.

The chassis 202 may also include a storage device (not illustrated, but which may include the storage device 108 discussed above with reference to FIG. 1) that includes a log database 224 that is coupled to the hot-swap controller fault reporting engine 222*a* in the remote access controller device 222 (e.g., via a coupling between the storage system and the processing system in the remote access controller device 222), and that may be configured to store logs (e.g., the System Event Logs (SELs) discussed below, and/or other logs known in the art) provided by the remote access controller device 222. However, while a specific computing device 200 has been illustrated, one of skill in the art in possession of the present disclosure will recognize that computing devices (or other devices operating according to the teachings of the present disclosure in a manner similar to that described below for the computing device 200) may include a variety of components and/or component configurations for providing conventional computing device functionality, as well as the functionality discussed below, while remaining within the scope of the present disclosure as well.

Figure 3:
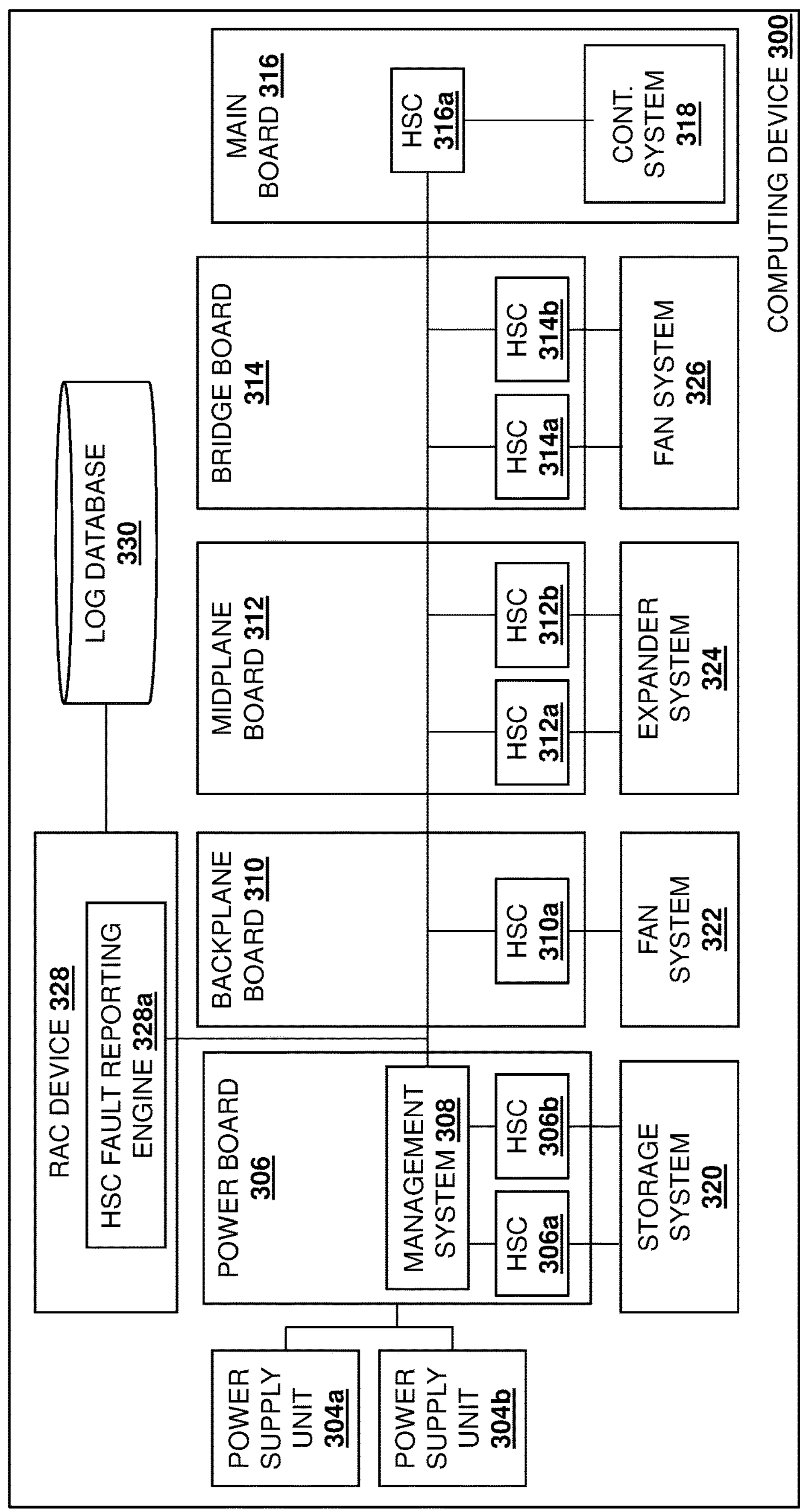
FIG. 3 is a schematic view illustrating an embodiment of a computing device that may include the hot-swap controller fault reporting system of the present disclosure.

Referring now to FIG. 3, another embodiment of a computing device 300 is illustrated that may utilize the hot-swap controller fault reporting system of the present disclosure. In an embodiment, the computing device 300 may be provided by the IHS 100 discussed above with reference to FIG. 1 and/or may include some or all of the components of the IHS 100, and in specific examples may be provided by a server system such as the DELL EMC® POWEREDGE® XE7100 available from DELL® EMC® of Hopkinton, Mass., United States and Round Rock, Tex., United States. Furthermore, while illustrated and discussed as being provided by a particular server system, one of skill in the art in possession of the present disclosure will recognize that the functionality of the computing device 300 discussed below may be provided by other devices that are configured to operate similarly as discussed below. In the illustrated embodiment, the computing device 300 includes a chassis 302 that houses the components of the computing device 300, only some of which are illustrated below. For example, the chassis 302 may house a plurality of power supply units 304*a* and 304*b*, and/or other power components known in the art.

In the illustrated embodiment, each of the power supply units 304*a* and 304*b* is coupled to a power board 306 (e.g., a Power Distribution Board (PDB) and/or other power circuit boards that would be apparent to one of skill in the art in possession of the present disclosure), which one of skill in the art in possession of the present disclosure will appreciate may be configured to distribute power from the power supply units 304*a* and 304*b* to the computing device components in the chassis 302, discussed in further detail below. As discussed below, the power board 306 may include a management system 308 such as a chassis manager, but that one of skill in the art in possession of the present disclosure will appreciate may be provided by any of a variety of other management systems known in the art. As illustrated, the management system 308 may include a processing system (not illustrated, but which may include the processor 102 discussed above with reference to FIG. 1) and a memory system (not illustrated, but which may include the memory 114 discussed above with reference to FIG. 1) that is coupled to the processing system and that includes instructions that, when executed by the processing system, cause the processing system to perform the functionality of the management systems discussed below.

In the illustrated embodiment, the power board 306 also includes a pair of Hot-Swap Controllers (HSCs) 306*a* and 306*b* that are each coupled to the management system 308. The chassis 302 also houses a backplane board 310 that includes an HSC 310*a* that is coupled to the management system 208, a midplane board 312 that includes a pair of HSCs 312*a* that are each coupled to the management system 208, a bridge board 314 that includes a pair of HSCs 314*a* that are each coupled to the management system 208, and a main board 316 that includes an HSC 316*a* that is coupled to the management system 208. Furthermore, the HSC 316*a* is coupled to a controller system 318 that is included on the main board 316, the HSCs 314*a* and 314*b* are coupled to a fan system 326 that is housed in the chassis 302, the HSCs 312*a* and 312*b* are coupled to an expander system 324 in the chassis 302, the HSC 310*a* is coupled to a fan system 322 in the chassis 302, and the HSCs 306*a* and 306*b* are coupled to a storage system 320 in the chassis 302.

As discussed above, the HSCs 306*a*/306*b*, 310*a*, 312*a*/312*b*, 314*a*/314*b*, and 316*a* may be configured to monitor, report, and protect the computing device 200 from faults (e.g., short circuits, over-current draws, etc.) associated with the storage system 320, the fan system 322, the expander system 324, the fan system 326, and the controller system 318, respectively, that could otherwise draw large currents that lead to computing device damage, power losses, and/or other fault issues known in the art. In a specific example in which the computing device 200 is provided by the DELL EMC® POWEREDGE® XE7100 server system discussed above, the controller system 318 on the main board 216 may be a Platform Controller Hub (PCH) on a motherboard that is monitored, reported, and protected by the board HSC 316*a*, the fan system 326 includes a plurality of "sled" fan devices (e.g., for server sleds in the chassis 302, not illustrated) that are monitored, reported, and protected by the HSCs 314*a* and 314*b*, the expander system 324 may be provided by one or more expander devices that are monitored, reported, and protected by the HSCs 312*a* and 312*b*, the fan system 322 includes a plurality of "chassis" fan devices (e.g., for the chassis 302) that are monitored, reported, and protected by the HSC 310*a*, and the storage system 320 includes a plurality of storage devices that are monitored, reported, and protected by the HSCs 306*a* and 306*b*. However, while specific computing device including specific components has been described, one of skill in the art in possession of the present disclosure will appreciate that other computing devices with other components will fall within the scope of the present disclosure as well.

As discussed below, the chassis 302 may include a hot-swap controller fault reporting subsystem that, in the embodiment illustrated in FIG. 3, is provided by a remote access controller device 328 that is coupled to the management system 308. In a specific example, the remote access controller device 328 may be provided by an integrated DELL® Remote Access Controller (iDRAC) available in server systems provided by DELL EMC® as discussed above, although other remote access controller devices/Baseboard Management Controller (BMC) devices will fall within the scope of the present disclosure as well. As illustrated, the remote access controller device 328 may include a processing system (not illustrated, but which may include the processor 102 discussed above with reference to FIG. 1) and a memory system (not illustrated, but which may include the memory 114 discussed above with reference to FIG. 1) that is coupled to the processing system and that includes instructions that, when executed by the processing system, cause the processing system to provide a Hot-Swap Controller (HSC) fault reporting engine 328*a* that is configured to perform the functionality of the hot-swap controller fault reporting engines and/or hot-swap controller fault reporting subsystems/remote access controller devices discussed below.

The chassis 302 may also include a storage device (not illustrated, but which may include the storage device 108 discussed above with reference to FIG. 1) that includes a log database 330 that is coupled to the hot-swap controller fault reporting engine 328*a* in the remote access controller device 328 (e.g., via a coupling between the storage system and the processing system in the remote access controller device 328), and that may be configured to store logs (e.g., the System Event Logs (SELs) discussed below, and/or other logs known in the art) provided by the remote access controller device 328. However, while a specific computing device 300 has been illustrated, one of skill in the art in possession of the present disclosure will recognize that computing devices (or other devices operating according to the teachings of the present disclosure in a manner similar to that described below for the computing device 300) may include a variety of components and/or component configurations for providing conventional computing device functionality, as well as the functionality discussed below, while remaining within the scope of the present disclosure as well.

Referring now to FIGS. 4A and 4B an embodiment of an HSC fault/Intelligent Platform Management Interface (IPMI) mapping 400 is illustrated that may be utilized by the hot-swap controller fault reporting subsystem/remote access controller device 222/remote access controller device 328 discussed above in order to report the hot-swap controller faults discussed below. As will be appreciated by one of skill in the art in possession of the present disclosure, the mapping 400 utilizes standard IPMI power unit sensor OEM event data bytes mapped to types of hot-swap controller faults, hot swap controller fault details, and hot-swap controller identifiers (e.g., identifying hot-swap controllers that report hot-swap faults). In the illustrated embodiment, the mapping 400 provides an example of first IPMI bits for first IPMI event data that are mapped to hot-swap controller fault information, second IPMI bits for second IPMI event data that are mapped to hot-swap controller fault information, and third IPMI bits for third IPMI event data that are mapped to hot-swap controller fault information.

In the specific example illustrated in FIG. 4A, the first IPMI event data (e.g., "EVENT DATA 1") illustrated in FIG. 4A includes bits 7:6 and Logical Unit Number (LUN) 10*b* mapped to Outside Equipment Manufacturer (OEM) code in byte 2 for a hot-swap controller failed event source, bits 5:4 and LUN 10*b* mapped to OEM code in byte 3 that identifies an HSC that triggered a failed event, and bits 3:0 mapped to an offset from event/reading code for a discrete event state, with a key code 0x6 mapped to a hot-swap controller hard fault (e.g., a Field Effect Transistor (FET) fault), and a key code 0x7 mapped to a hot-swap controller power fault. As will be appreciated by one of skill in the art in possession of the present disclosure, bits 7:6 and bits 5:4 in the first IPMI event data may be utilized to identify that a custom IPMI fault is being reported via the hot-swap controller fault reporting system of the present disclosure, while bits 3:0 and key codes 0x6 and 0x7 may allow for the identification of a type of hot-swap controller fault (e.g., hot-swap controller hard faults or hot-swap controller power faults in the examples provided herein). As will be appreciated by one of skill in the art in possession of the present disclosure, hot-swap controller hard faults may be unrecoverable and may be identified so that a component may be replaced, while hot-swap controller power faults may be recoverable and identified to allow for the prediction of future failures of the component.

In the specific example illustrated in FIG. 4A, the second IPMI event data (e.g., "EVENT DATA 2") illustrated in FIG. 4A includes bit 0 and LUN 1*b* mapped to an Over Current (OC) hot swap controller fault type, bit 1 and LUN 1*b* mapped to an Over Voltage (OV) hot swap controller fault type, bit 2 and LUN 1*b* mapped to an Under Voltage (UV) hot swap controller fault type, bit 3 and LUN 1*b* mapped to an Over Temperature (OT) hot swap controller fault type, bit 4 and LUN 1*b* mapped to a common failure hot swap controller fault type, and bits 7:5 reserved. As will be appreciated by one of skill in the art in possession of the present disclosure, bits 0, 1, 2, 3, or 4 in the second IPMI event data may be utilized to provide hot-swap controller fault details about the type of hot-swap controller fault reported in the first IPMI event data (e.g., that a hot-swap controller hard fault or a hot-swap controller power fault is associated with an over-current condition, an over-voltage condition, an under-voltage condition, an over-temperature condition, or a common failure in the examples provided herein).

In the specific example illustrated in FIG. 4B, the third IPMI event data (e.g., "EVENT DATA 3") illustrated in FIG. 4A provides hot-swap controller numbers and includes bit 0 and LUN 1*b* mapped to a first hot swap controller (e.g., "HSC1"), bit 1 and LUN 1*b* mapped to a second hot swap controller (e.g., "HSC2"), bit 2 and LUN 1*b* mapped to a third hot swap controller (e.g., "HSC3"), bit 3 and LUN 1*b* mapped to a fourth hot swap controller (e.g., "HSC4"), bit 4 and LUN 1*b* mapped to a fifth hot swap controller (e.g., "HSC5"), bit 5 and LUN 1*b* mapped to a sixth hot swap controller (e.g., "HSC6"), and bits 7:6 reserved. As will be appreciated by one of skill in the art in possession of the present disclosure, bits 0, 1, 2, 3, 4, or 5 in the third IPMI event data may be utilized to identify a hot-swap controller reporting a hot-swap controller fault identified in the first and second IPMI event data.

Figure 5:
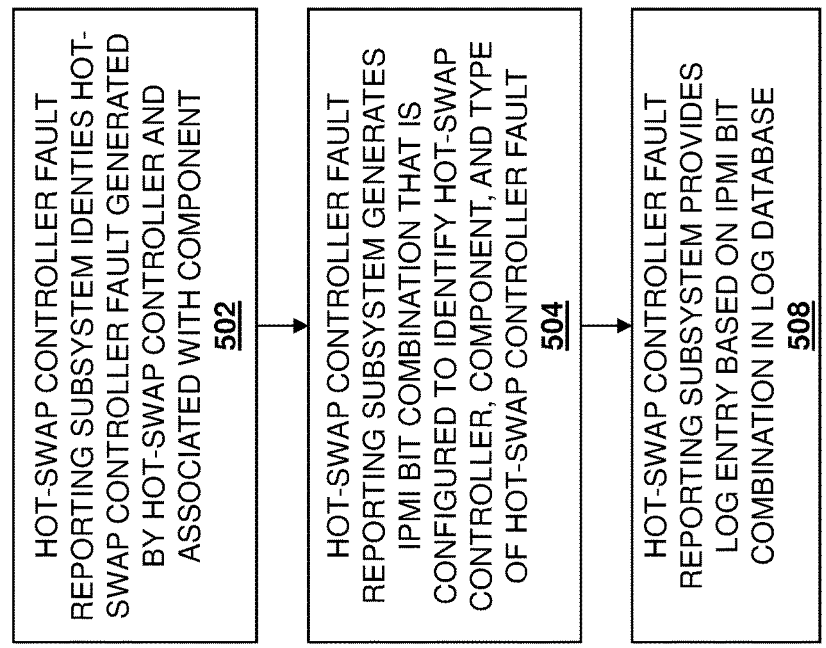
FIG. 5 is a flow chart illustrating an embodiment of a method for reporting hot-swap controller faults

Referring now to FIG. 5, an embodiment of a method 500 for reporting hot-swap controller faults is illustrated. As discussed below, the systems and methods of the present disclosure provide for the reporting of hot-swap controller faults generated by hot-swap controllers via the generation of IPMI bit combinations based on those hot-swap controller faults, with those IPMI bit combinations logged by a remote access controller device to a log database. For example, the hot-swap controller fault reporting system of the present disclosure includes component(s), a hot-swap controller that is coupled to the component(s), and a hot-swap controller fault reporting subsystem that is coupled to the hot-swap controller. The hot-swap controller fault reporting subsystem identifies a hot-swap controller fault that was generated by the hot-swap controller and that is associated with the component(s), generates an Intelligent Platform Management Interface (IPMI) bit combination that is based on the hot-swap controller fault and that is configured to identify the hot-swap controller and a type of the hot-swap controller fault, and provides a log entry based on the IPMI bit combination in a log database. As will be appreciated by one of skill in the art in possession of the present disclosure, embodiments of the systems and methods of the present disclosure may model hot-swap controller faults via IPMI sensor/software tools and utilities, thus allowing for the alerting of users to hot-swap controller faults via System Event Logs (SELs).

Figure 6A:
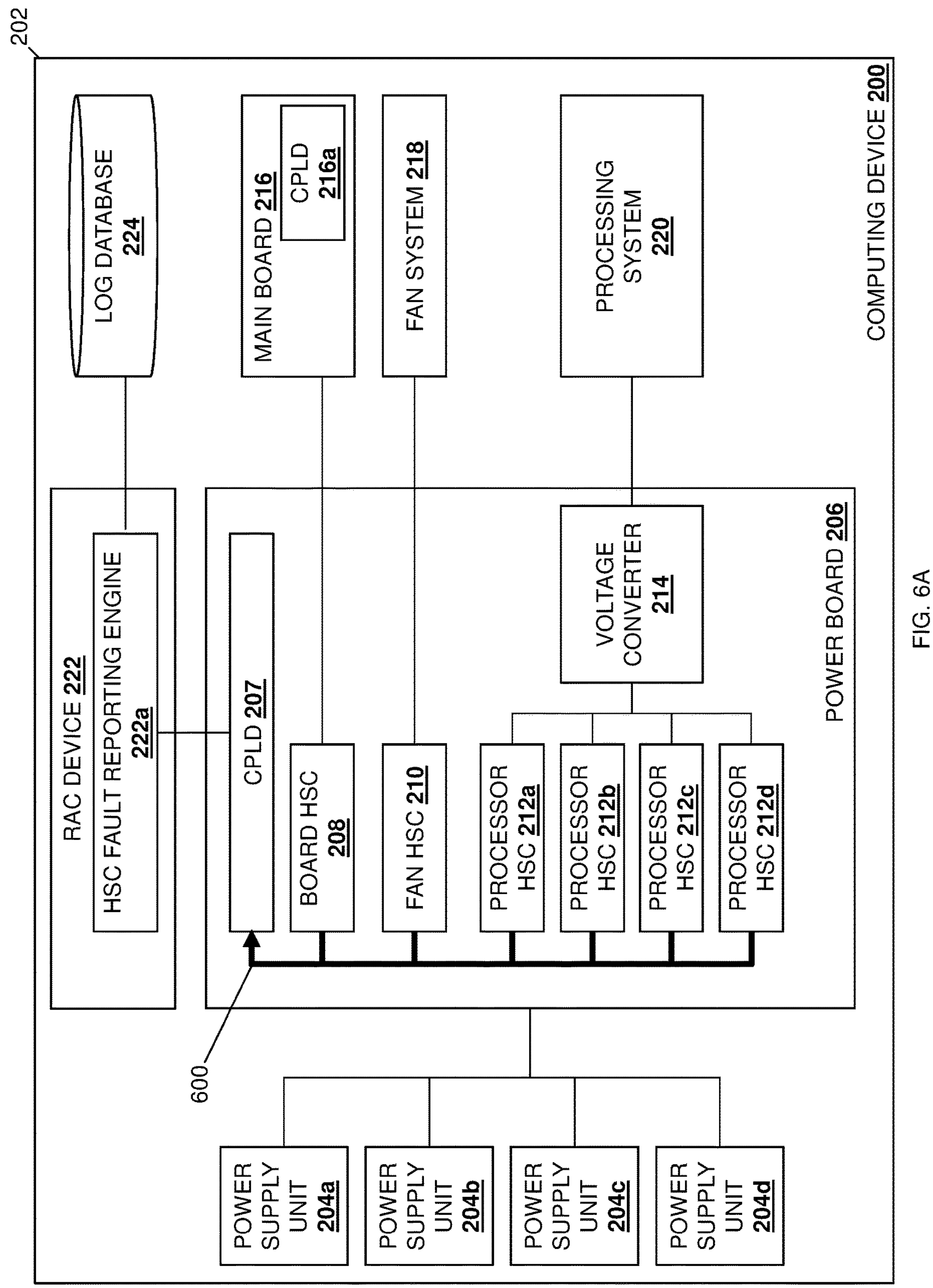
FIG. 6A is a schematic view illustrating an embodiment of the computing device of FIG. 2 operating during the method of FIG. 5.
Figure 6B:
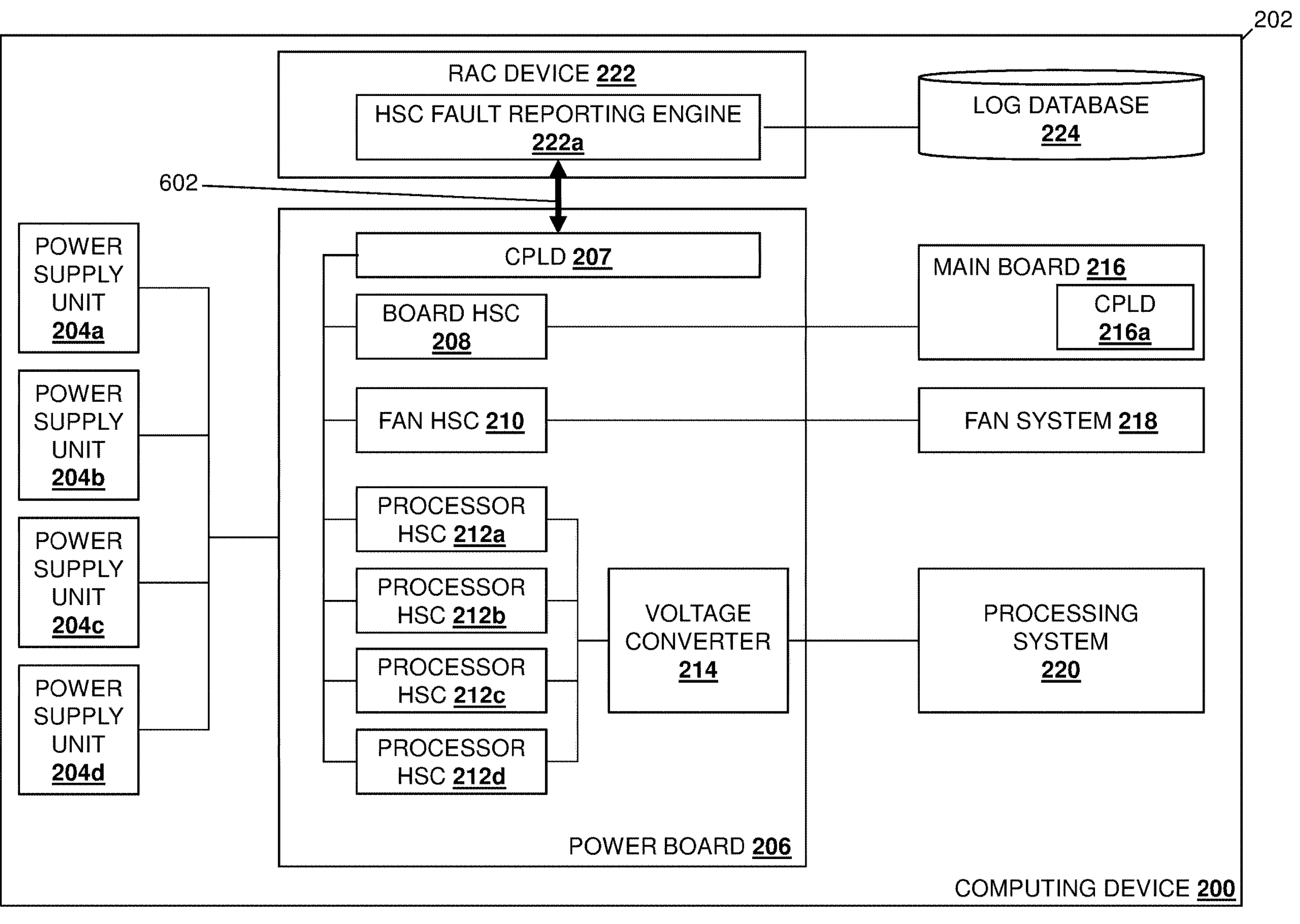
FIG. 6B is a schematic view illustrating an embodiment of the computing device of FIG. 2 operating during the method of FIG. 5.

The method 500 begins at block 502 where a hot-swap controller fault reporting subsystem identifies a hot-swap controller fault generated by a hot-swap controller and associated with a component. With reference to FIGS. 6A and 6B, in an embodiment of block 502, the CPLD 207 may perform hot-swap controller fault monitoring operations 600 that may include monitoring each of the board HSC 208, the fan HSC 210, and the processor HSCs 212*a*-212*d* to identify any hot-swap faults generated by the board HSC 208, the fan HSC 210, and the processor HSCs 212*a*-212*d*. As will be appreciated by one of skill in the art in possession of the present disclosure, each of the board HSC 208, the fan HSC 210, and the processor HSCs 212*a*-212*d* may be configured to monitor, report, and protect the computing device 200 from faults (e.g., short circuits, over-current draws, etc.) associated with the main board 216, the fan system 218, and processing devices in the processing system 220, respectively, that could otherwise draw large currents that lead to computing device damage, power losses, and/or other fault issues known in the art. As such, when that monitoring performed by the board HSC 208, the fan HSC 210, and the processor HSCs 212*a*-212*d* detects a fault, a corresponding hot-swap controller fault may be generated and reported by that hot-swap controller to the CPLD 207 such that the CPLD 207 sets its register subsystem based on that hot-swap controller fault.

At block 502, the hot-swap controller fault reporting engine 222*a* in the remote access controller device 222 may then perform hot-swap controller fault identification operations 602 that include accessing the register subsystem in the CPLD 207 to identify any hot-swap controller fault reported by the board HSC 208, the fan HSC 210, and/or the processor HSCs 212*a*-212*d* to the CPLD 207. For example, the identification of a hot-swap controller fault by the hot-swap fault reporting engine 222*a* in the remote access controller device 222 may include the identification of the hot-swap controller that reported that hot-swap controller fault, a type of the hot-swap controller fault that was reported (e.g., the hot-swap controller hard faults or the hot-swap controller power faults and associated over-current fault details, over-voltage fault details, under-voltage fault details, over-temperature fault details, common failure fault details, and/or other faults that would be apparent to one of skill in the art in possession of the present disclosure), and/or any other hot-swap controller fault information that may have been provided by the CPLD 207 in its register subsystem. As such, at block 502, the hot-swap fault reporting engine 222*a* in the remote access controller device 222 may identify a particular type of hot-swap controller fault reported by the board HSC 208 to the CPLD 207 in response to a fault associated with the main board 216, a particular type of hot-swap controller fault reported by the fan HSC 210 to the CPLD 207 in response to a fault associated with the fan system 218, and/or particular types of hot-swap controller faults reported by the processor HSCs 212*a*-212*d* to the CPLD 207 in response to faults associated with the processors in the processing system 220.

Figure 7A:
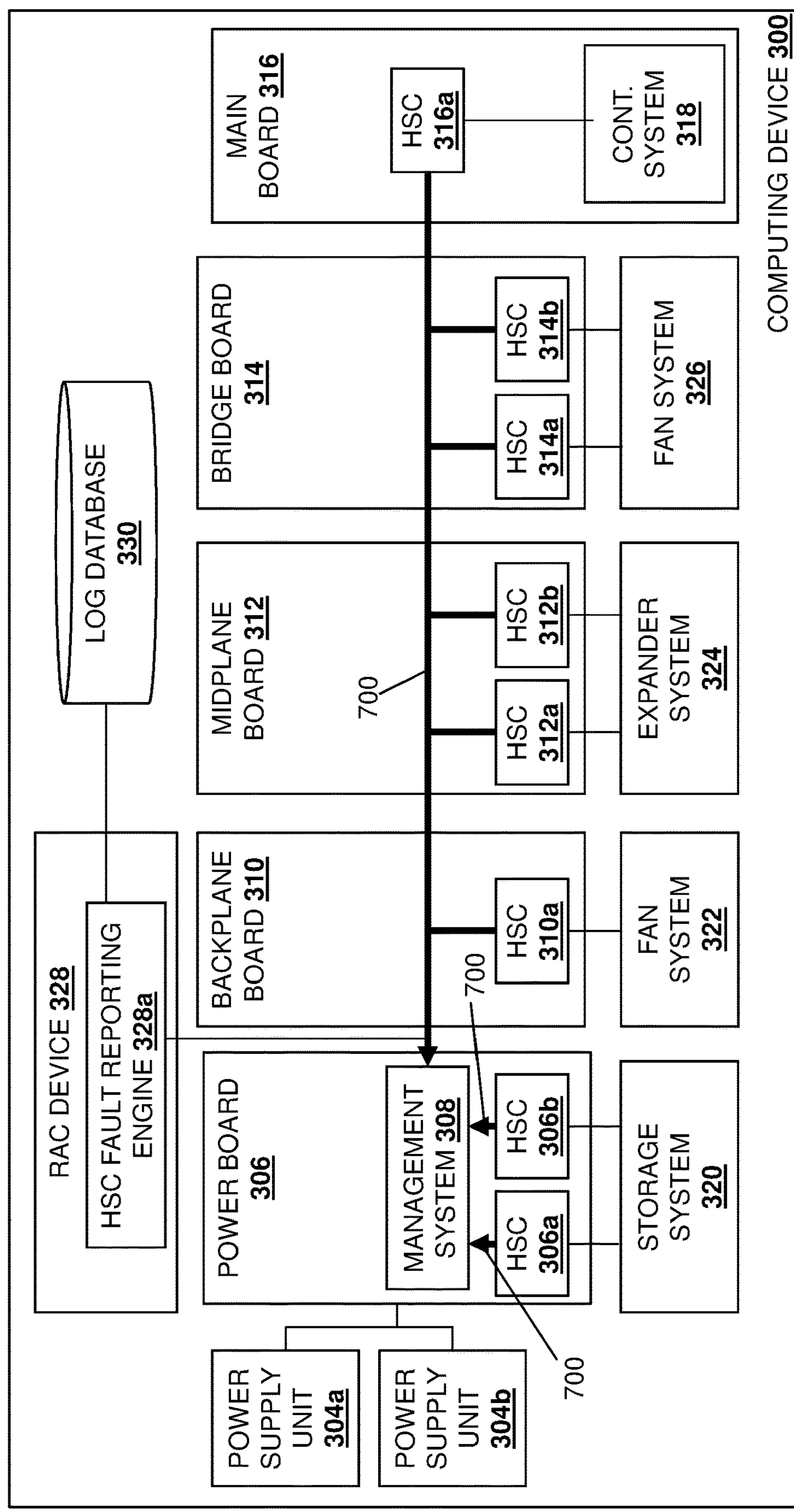
FIG. 7A is a schematic view illustrating an embodiment of the computing device of FIG. 3 operating during the method of FIG. 5.
Figure 7B:
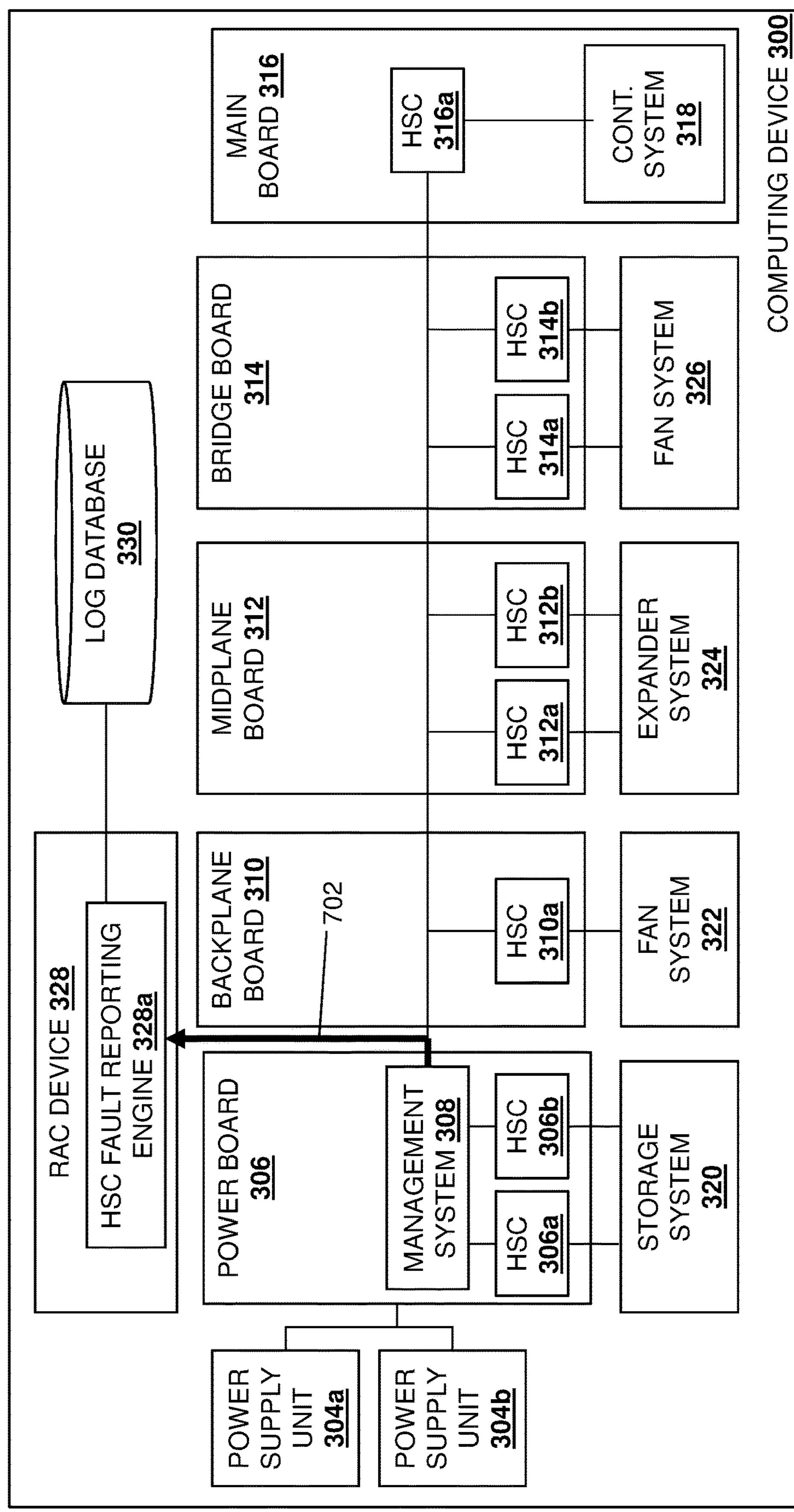
FIG. 7B is a schematic view illustrating an embodiment of the computing device of FIG. 3 operating during the method of FIG. 5.

With reference to FIGS. 7A and 7B, in another embodiment of block 502, the management system 308 may perform hot-swap controller fault monitoring operations 700 that may include monitoring each of the HSCs 306*a*/306*b*, the HSC 310*a*, the HSCs 312*a*/312*b*, the HSCs 314*a*/314*b*, and the HSC 316*a* to identify any hot-swap faults generated by the HSCs 306*a*/306*b*, the HSC 310*a*, the HSCs 312*a*/312*b*, the HSCs 314*a*/314*b*, and the HSC 316*a*. As will be appreciated by one of skill in the art in possession of the present disclosure, each of the HSCs 306*a*/306*b*, the HSC 310*a*, the HSCs 312*a*/312*b*, the HSCs 314*a*/314*b*, and the HSC 316*a* may be configured to monitor, report, and protect the computing device 300 from faults (e.g., short circuits, over-current draws, etc.) associated with the storage system 320, the fan system 322, the expander system 324, the fan system 326, and the controller system 318, respectively, that could otherwise draw large currents that lead to computing device damage, power losses, and/or other fault issues known in the art. As such, when that monitoring performed by the HSCs 306*a*/306*b*, the HSC 310*a*, the HSCs 312*a*/312*b*, the HSCs 314*a*/314*b*, and the HSC 316*a* detects a fault, a corresponding hot-swap controller fault may be generated and reported by that hot-swap controller to the management system 30 such that the management system 308 generates and transmits a communication to the hot-swap controller fault reporting engine 328*a* in the remote access controller device 328 based on that hot-swap controller fault.

As illustrated in FIG. 7B, in an embodiment of block 502, the management system 308 may perform hot-swap controller fault reporting operations 702 that include transmitting a communication that identifies the hot-swap controller fault reported to the management system 308 at block 502, which allows the hot-swap controller fault reporting engine 328*a* in the remote access controller device 328 to identify that hot-swap controller fault. In a specific embodiment, the management system 308 may transmit the communication using an IPMI sub-command for sending fault events to the hot-swap controller fault reporting engine 328*a* in the remote access controller device 328 as part of a management controller/remote access controller device communication protocol. For example, such communications provided via a management controller/remote access controller device communication protocol may be defined as follows:

| IPMI COMMAND CODE | IPMI SUB-COMMAND CODE | SUB-COMMAND NAME | REQUEST/RESPONSE |
|---|---|---|---|
| 0xC8 | 0x1B | Get HSC fault events (management system →remote access controller device) | Request:<br><br>Byte 1: Sub-command total payload length LSB<br>Byte 2: Sub-command total payload length MSB<br>Byte 3: The number of properties. The value = 07 = total HSCs<br>Byte 4: Property-1 length = 4<br>Byte 5: Property-1 ID = HSC1 Element = 1<br>Byte 6: Property-1 Index<br>Byte 7: Property-1 Value#1<br>Byte 8: Property-1 Value#2<br>. . .<br>Byte 34: Property 34: Property-7 length = 4<br>Byte 35: Property-7 ID = HSC7 Element = 7<br>Byte 36: Property-7 index |

-continued

| IPMI COMMAND CODE | IPMI SUB-COMMAND CODE | SUB-COMMAND NAME | REQUEST/RESPONSE |
|---|---|---|---|
| | | | Byte 37: Property-7 Value#1<br>Byte 38: Property-7 Value#2<br>Response:<br>Byte 1: Generic Completion Code<br>Byte 2: Sub-command ID<br>Byte 3: Sub-command Data Length LSB<br>Byte 4: Sub-command Data Length MSB |

As such, at block 502, the hot-swap controller fault reporting engine 328*a* in the remote access controller device 328 may perform hot-swap controller fault identification operations to identify any hot-swap controller fault reported by the HSCs 306*a*/306*b*, the HSC 310*a*, the HSCs 312*a*/312*b*, the HSCs 314*a*/314*b*, and the HSC 316*a* to the management system 308, and communicated by the management system 328 to the hot-swap controller fault reporting engine 328*a* in the remote access controller device 328. For example, the identification of a hot-swap controller fault by the hot-swap fault reporting engine 328*a* in the remote access controller device 328 may include the identification of the hot-swap controller that reported that hot-swap controller fault, a type of the hot-swap controller fault that was reported (e.g., the hot-swap controller hard faults or the hot-swap controller power faults and associated over-current fault details, over-voltage fault details, under-voltage fault details, over-temperature fault details, common failure fault details, and/or other faults that would be apparent to one of skill in the art in possession of the present disclosure), and/or any other hot-swap controller fault information that may be communicated by the management system 308.

As such, at block 502, the hot-swap fault reporting engine 328*a* in the remote access controller device 328 may identify a particular type of hot-swap controller fault reported by the HSCs 306*a*/306*b* to the management system 308 in response to a fault associated with the storage system 320, a particular type of hot-swap controller fault reported by the HSC 310*a* to the management system 308 in response to a fault associated with the fan system 322, a particular type of hot-swap controller fault reported by the HSCs 312*a*/312*b* to the management system 308 in response to a fault associated with the expander system 324, a particular type of hot-swap controller fault reported by the HSCs 314*a*/314*b* to the management system 308 in response to a fault associated with the fan system 326, and/or a particular type of hot-swap controller fault reported by the HSC 316*a* to the management system 308 in response to a fault associated with the controller system 318.

The method 500 then proceeds to block 504 where the hot-swap controller fault reporting subsystem generates an IPMI bit combination that is configured to identify the hot-swap controller and a type of the hot-swap controller fault. In an embodiment, at block 504, the hot-swap fault reporting engine 222*a* in the remote access controller device 222 may utilize the mapping 400 discussed above with reference to FIGS. 4A and 4B to generate an IPMI bit combination that identifies that a custom IPMI fault is being reported via the hot-swap controller fault reporting system of the present disclosure (e.g., via the bits 7:6 and bits 5:4 in the first IPMI event data as discussed with regard to the mapping 400 discussed above), the hot-swap controller that reported the hot-swap controller fault identified at block 502 (e.g., via bits 0, 1, 2, 3, 4, or 5 in the first IPMI event data as discussed with regard to the mapping 400 discussed above), and the type of the hot-swap controller fault identified at block 502 (e.g., via bits 3:0 and key codes 0x6 or 0x7 in the first IPMI event data, and via bits 0, 1, 2, 3, or 4 in the second IPMI event data as discussed with regard to the mapping 400 discussed above).

In another embodiment, at block 504, the hot-swap fault reporting engine 328*a* in the remote access controller device 328 may utilize the mapping 400 discussed above with reference to FIGS. 4A and 4B to generate an IPMI bit combination that identifies the hot-swap controller that reported the hot-swap controller fault identified at block 502, and the type of the hot-swap controller fault identified at block 502. For example, based on the hot-swap controller fault identified at block 502, the hot-swap fault reporting engine 328*a* in the remote access controller device 328 328 may generate an IPMI bit combination that includes bits 7:6 and 5:4 for first IPMI event data (e.g., "EVENT DATA 1") to identify that a custom IPMI fault is being reported via the hot-swap controller fault reporting system of the present disclosure, includes bits 3:0 and key code 0x6 or 0x7 for the first IPMI event data along with bit 0, 1, 2, 3, or 4 for the second IPMI event data (e.g., "EVENT DATA 2") to reference the type of the hot-swap controller fault identified at block 502 and details about that hot-swap controller fault (e.g., key code 0x6 or 0x7 with bits 3:0 for the first IPMI event data to identify a hot-swap controller hard fault type or a hot-swap controller power fault, along with bit 0 for an over-current fault detail, bit 1 for an over-voltage fault detail, bit 2 for an under-voltage fault detail, bit 3 for an over-temperature fault detail, and bit 4 for a common-failure fault detail), and includes bit 0, 1, 2, 3, 4, or 5 for the third IPMI event data (e.g., "EVENT DATA 3") to reference the hot-swap controller that reported the hot-swap controller fault identified at block 502 (e.g., bit 0 for a hot-swap controller identified as HSC1, bit 1 for a hot-swap controller identified as HSC2, bit 2 for a hot-swap controller identified as HSC3, bit 3 for a hot-swap controller identified as HSC4, bit 4 for a hot-swap controller identified as HSC5, and bit 5 for a hot-swap controller identified as HSC6).

Figure 6C:
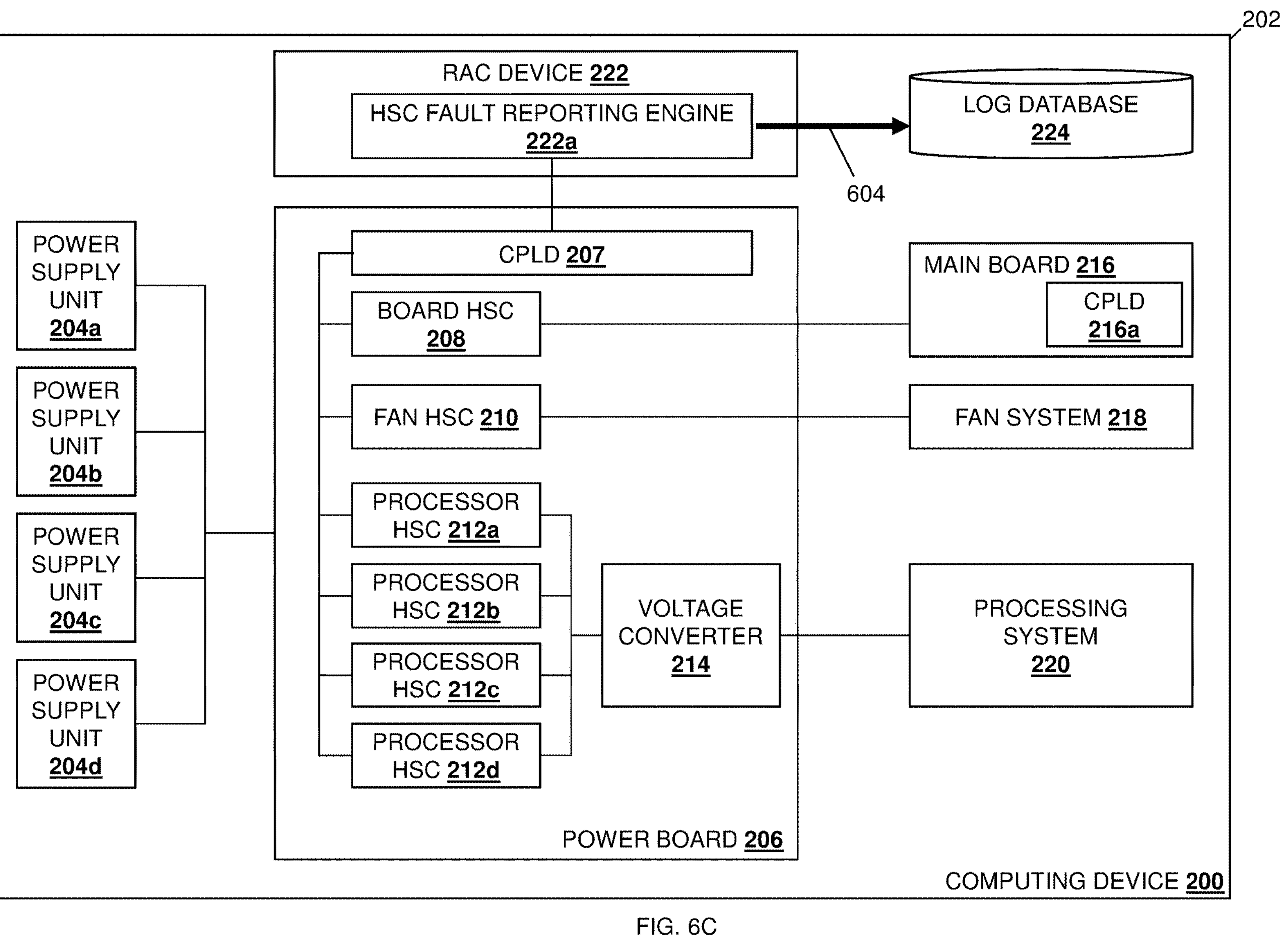
FIG. 6C is a schematic view illustrating an embodiment of the computing device of FIG. 2 operating during the method of FIG. 5.

The method 500 then proceeds to block 506 where the hot-swap controller fault reporting subsystem provides a log entry based on the IPMI bit combination in a log database. With reference to FIG. 6C, in an embodiment of block 506, the hot-swap fault reporting engine 222*a* in the remote access controller device 222 may perform log entry operations 604 that include providing a log entry in the log database 224 that is based on the IPMI bit combination generated at block 504.

For example, at block 506, the hot-swap fault reporting engine 222*a* in the remote access controller device 222 may perform the log entry operations 604 to provide a System Event Log (SEL) entry in the log database 330 that identifies that hot-swap controller that reported the hot-swap controller fault, and the type of the hot-swap controller fault. In some embodiments, the remote access controller device 222 may include a mapping between hot-swap controllers and their corresponding components that they monitor, and thus may identify any component associated with a hot-swap controller fault in the log entry as well. In some examples, subsequent to providing the log entry in the log database 224, the hot-swap fault reporting engine **222*a* in the remote access controller device 222** may clear (or instruct the CPLD to clear) its register system (e.g., a memory register) to, for example, clear the identification of the hot-swap controller.

Figure 7C:
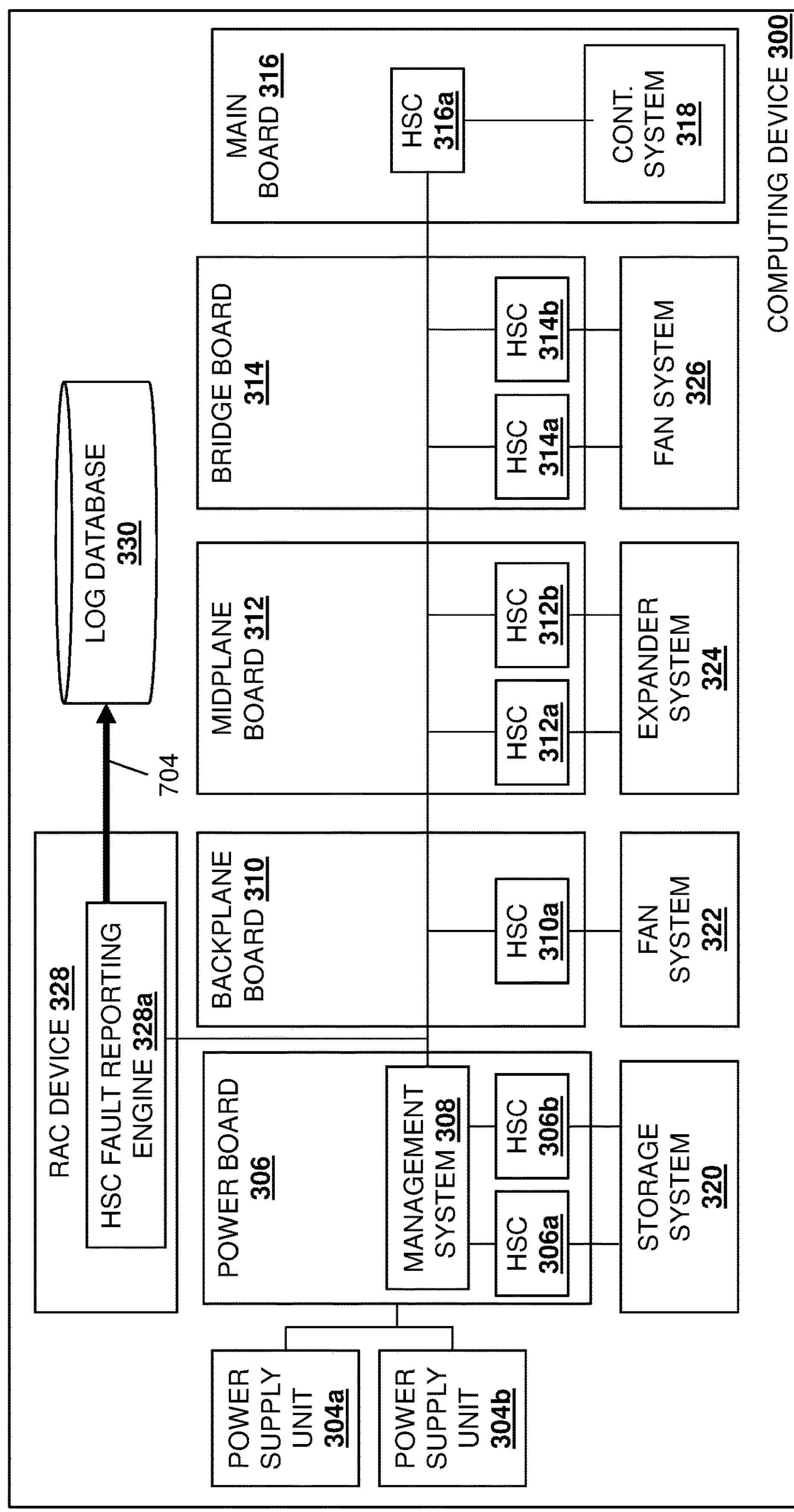
FIG. 7C is a schematic view illustrating an embodiment of the computing device of FIG. 3 operating during the method of FIG. 5.

With reference to FIG. 7C, in an embodiment of block 506, the hot-swap fault reporting engine **328*a* in the remote access controller device 328 may perform log entry operations 704 that include providing a log entry in the log database 330 that is based on the IPMI bit combination generated at block 504. For example, at block 506, the hot-swap fault reporting engine 328*a* in the remote access controller device 328 may perform log entry operations 704 to provide a System Event Log (SEL) entry in the log database 330 that identifies that hot-swap controller that reported the hot-swap controller fault, and the type of the hot-swap controller fault. In some embodiments, the hot-swap fault reporting engine 328*a* in the remote access controller device 328 may include a mapping between hot-swap controllers and their corresponding components that they monitor, and thus may identify any component associated with a hot-swap controller fault in the log entry as well. In some examples, subsequent to providing the log entry in the log database 330, the hot-swap fault reporting engine 328*a* in the remote access controller device 328 may instruct the management system 308** to clear the identification of the hot-swap controller that reported the hot-swap controller fault.

Thus, systems and methods have been described that provide for the reporting of hot-swap controller faults generated by hot-swap controllers via the generation of IPMI bit combinations based on those hot-swap controller faults, and the logging of those IPMI bit combinations into to a log database. For example, the hot-swap controller fault reporting system of the present disclosure includes component(s), a hot-swap controller that is coupled to the component(s), and a hot-swap controller fault reporting subsystem that is coupled to the hot-swap controller. The hot-swap controller fault reporting subsystem identifies a hot-swap controller fault that was generated by the hot-swap controller and that is associated with the component(s), generates an Intelligent Platform Management Interface (IPMI) bit combination that is based on the hot-swap controller fault and that is configured to identify the hot-swap controller and a type of the hot-swap controller fault, and provides a log entry based on the IPMI bit combination in a log database. As will be appreciated by one of skill in the art in possession of the present disclosure, embodiments of the systems and methods of the present disclosure allow users of server systems to be alerted about hot-swap controller faults via System Event Log (SEL) logging based on IPMI bit combinations generated from those hot-swap controller faults, further allowing the user to determine whether a component needs to be replaced, predict the future failure of a component, and/or utilize OEM event data to retrieve more information about that hot-swap controller fault.

Although illustrative embodiments have been shown and described, a wide range of modification, change and substitution is contemplated in the foregoing disclosure and in some instances, some features of the embodiments may be employed without a corresponding use of other features. Accordingly, it is appropriate that the appended claims be construed broadly and in a manner consistent with the scope of the embodiments disclosed herein.

What is claimed is:

1. A hot-swap controller fault reporting system, comprising:

at least one component;

a hot-swap controller that is coupled to the at least one component;

a log database; and a hot-swap controller fault reporting subsystem that is coupled to the hot-swap controller and the log database, wherein the hot-swap controller fault reporting subsystem is configured to:

identify a hot-swap controller fault that was generated by the hot-swap controller and that is associated with the component; and generate, based on the hot-swap controller fault, an Intelligent Platform Management Interface (IPMI) bit combination that is configured to identify the hot-swap controller and a type of the hot-swap controller fault; and provide a log entry based on the IPMI bit combination in the log database.

2. The system of claim 1, wherein the hot-swap controller fault reporting subsystem is included in a remote access controller device.

3. The system of claim 2, wherein the remote access controller device is configured to identify the hot-swap controller fault by accessing a register subsystem in a Complex Programmable Logic Device (CPLD).

4. The system of claim 2, wherein the remote access controller device is configured to identify the hot-swap controller fault via a communication transmitted by a chassis management module.

5. The system of claim 1, wherein the log entry based on the IPMI bit combination is provided in a System Event Log (SEL) in the log database.

6. The system of claim 1, wherein the IPMI bit combination includes at least one first IPMI bit providing first IPMI event data that is configured to identify the hot-swap controller, and at least one second IPMI bit providing second IPMI event data that identifies the type of the hot-swap controller fault.

7. An Information Handling System (IHS), comprising:

a processing system; and a memory system that is coupled to the processing system and that includes instructions that, when executed by the processing system, cause the processing system to provide a hot-swap controller fault reporting engine that is configured to:

identify a hot-swap controller fault that was generated by a hot-swap controller and that is associated with a component that is coupled to the hot-swap controller;

generate, based on the hot-swap controller fault, an Intelligent Platform Management Interface (IPMI) bit combination that is configured to identify the hot-swap controller and a type of the hot-swap controller fault; and provide a log entry based on the IPMI bit combination in a log database.

8. The IHS of claim 7, wherein the processing system that provides the hot-swap controller fault reporting engine is included in a remote access controller device.

9. The IHS of claim 8, wherein the remote access controller device is configured to identify the hot-swap controller fault accessing a register subsystem in a Complex Programmable Logic Device (CPLD).

10. The IHS of claim 8, wherein the remote access controller device is configured to identify the hot-swap controller fault via a communication transmitted by a chassis management module.

11. The IHS of claim 7, wherein the IPMI bit combination includes at least one first IPMI bit providing first IPMI event data that is configured to identify the hot-swap controller.

12. The IHS of claim 7, wherein the IPMI bit combination includes at least one second IPMI bit providing second IPMI event data that identifies the type of the hot-swap controller fault.

13. The IHS of claim 7, wherein the log entry based on the IPMI bit combination is provided in a System Event Log (SEL) in the log database.

14. A method for reporting hot-swap controller faults, comprising:

identifying, by a hot-swap controller fault reporting subsystem, a hot-swap controller fault that was generated by a hot-swap controller and that is associated with a component that is coupled to the hot-swap controller;

generating, by the hot-swap controller fault reporting subsystem based on the hot-swap controller fault, an Intelligent Platform Management Interface (IPMI) bit combination that is configured to identify the hot-swap controller and a type of the hot-swap controller fault; and providing, by the hot-swap controller fault reporting subsystem, a log entry based on the IPMI bit combination in a log database.

15. The method of claim 14, wherein the hot-swap controller fault reporting subsystem is included in a remote access controller device.

16. The method of claim 15, wherein the remote access controller device identifies the hot-swap controller fault by accessing a register subsystem in a Complex Programmable Logic Device (CPLD).

17. The method of claim 15, wherein the remote access controller device is configured to identify the hot-swap controller fault via a communication transmitted by a chassis management module.

18. The method of claim 14, wherein the IPMI bit combination includes at least one first IPMI bit providing first IPMI event data that is configured to identify the hot-swap controller.

19. The method of claim 14, wherein the IPMI bit combination includes at least one second IPMI bit providing second IPMI event data that identifies the type of the hot-swap controller fault.

20. The method of claim 14, wherein the log entry based on the IPMI bit combination is provided in a System Event Log (SEL) in the log database.

* * * * *